Figure 1:
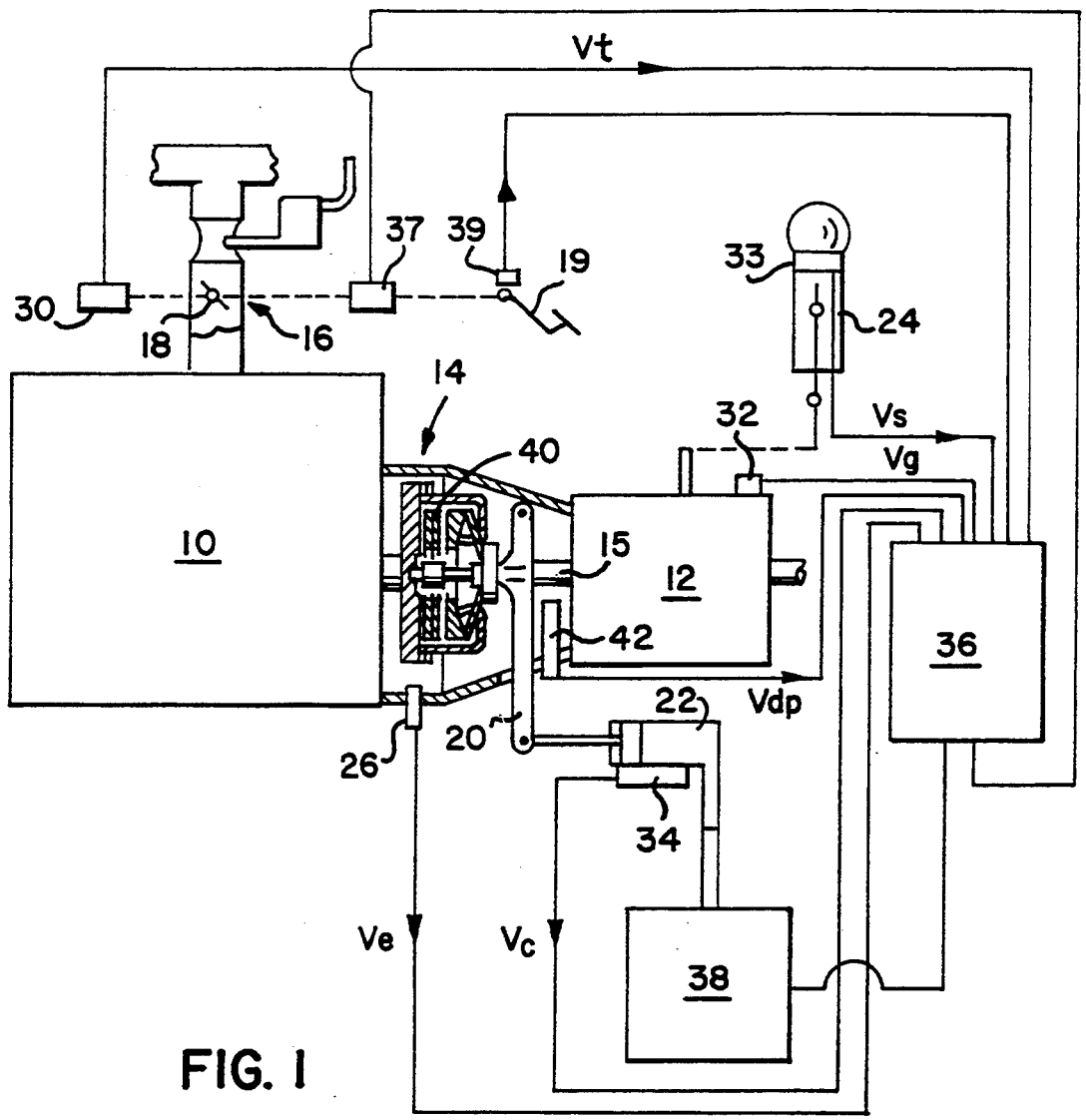

United States Patent [19]

Jarvis

[11] Patent Number: 5,413,542
[45] Date of Patent: May 9, 1995

[54] CLUTCH CONTROL SYSTEM

[76] Inventor: Roger P. Jarvis, 87 Lime Avenue, Leamington Spa, Warwickshire CV32 7DG, Great Britain

[21] Appl. No.: 162,046
[22] PCT Filed: May 28, 1992
[86] PCT No.: PCT/GB92/00973
 § 371 Date: Dec. 8, 1993
 § 102(e) Date: Dec. 8, 1993
[87] PCT Pub. No.: WO93/00227
 PCT Pub. Date: Jan. 7, 1993

[30] Foreign Application Priority Data

Jun. 28, 1991 [GB] United Kingdom ................. 9114005

[51] Int. Cl.⁶ ............................................. B60K 41/02
[52] U.S. Cl. ........................................ 477/84; 477/78; 477/174; 477/109
[58] Field of Search ................. 477/83, 84, 89, 78, 477/109, 110, 166, 174, 175

[56] References Cited

U.S. PATENT DOCUMENTS

| 4,732,246 | 3/1988 | Tateno et al. | 477/78 |
| 4,899,857 | 2/1990 | Tateno et al. | 477/78 X |
| 5,038,287 | 8/1991 | Taniguchi et al. | 477/109 X |
| 5,072,815 | 12/1991 | Jarvis | 477/83 X |

FOREIGN PATENT DOCUMENTS 61-205521 9/1986 Japan ................................. 477/175

Primary Examiner—Charles A. Marmor
Assistant Examiner—Nathian O. Jensen

[57] ABSTRACT

A clutch control system for a motor vehicle comprising a clutch position sensor (34), a throttle position sensor (30), gear selector (24), clutch actuator (22), and a control means (36, 38). When the gear selector (24) initiates a gear change the clutch actuator (22) holds the clutch in a partially disengaged position until the vehicle throttle signal (Vt) falls below a predetermined value (TL) which is based on the friction clutch driven plate speed in the clutch was disengaged and the driven plate was being rotated by the speed of the vehicle.

9 Claims, 2 Drawing Sheets

CLUTCH CONTROL SYSTEM

This invention concerns semiautomatic or fully automatic clutch control systems and in particular clutch disengagement during gear changes controlled by such systems.

WO 89/10282 discloses a clutch control system comprising a clutch position sensor, a throttle position sensor, gear selection means, clutch actuation means, and control means arranged to cause the clutch to disengage for a gear shift initiated by the gear selection means.

It is a shortcoming of that system that the clutch actuation means starts from a completely de-energised condition and is subject to some variation in its response time. Also the throttle can be in any position when the clutch disengages. There can therefore be considerable torque being transmitted whose sudden release on clutch disengagement can give rise to engine flare and driveline shock.

The present invention aims to provide a clutch control system which can provide a smooth and shock free clutch disengagement.

The present invention provides a motor vehicle clutch control system for a vehicle friction clutch comprising a clutch position sensor, a throttle position sensor, gear selection means, clutch actuation means and control means, arranged such that during clutch disengagement for a gear shift initiated by the gear selection means the clutch actuation means holds the clutch in a martially disengaged position until the sensed throttle signal falls below a predetermined throttle value.

The present invention can be included in a system where gear selection is manual, or servo operated in response to a driver controlled switch or pushbuttons, or fully automated with gearshifts initiated by the control means. It can also be used either in a system where the throttle is controlled, during at least mart of the gear change, by the control means, or where the throttle is controlled completely by the driver.

Figure 2:
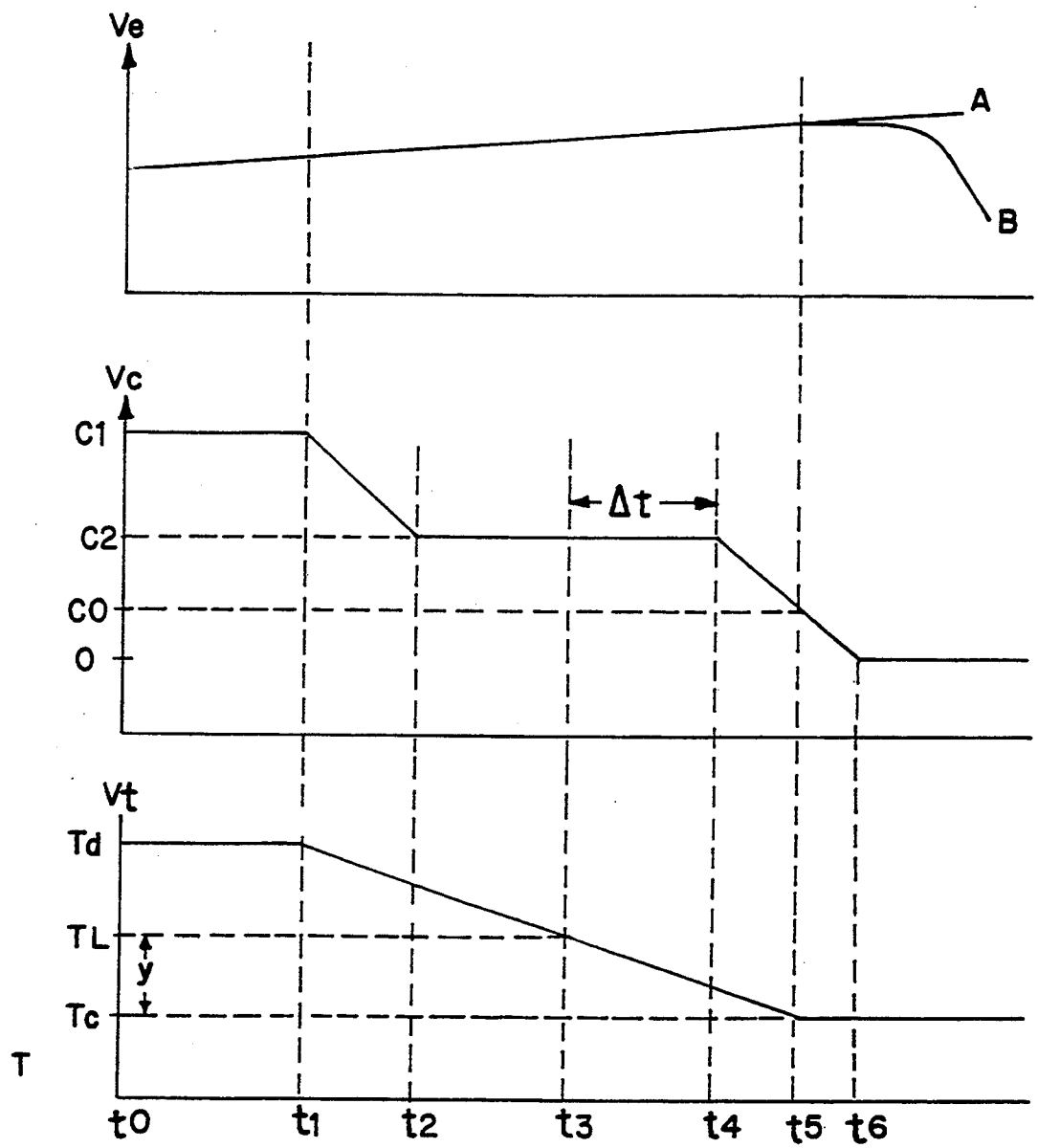

A preferred embodiment of the present invention will now be described by way of example only with reference to the accompanying drawings in which:

FIG. 1 is a diagrammatic representation of a vehicle clutch control system according to the invention, and FIG. 2 shows the variation with time of various parameters of the clutch control system of FIG. 1 during a gear change to a higher gear ratio.

Referring to FIG. 1 a vehicle clutch system comprises an engine 10 and a gearbox 12 coupled through a friction clutch 14, including the usual driven plate, via a gearbox input shaft 15. Fuel is supplied to the engine by a throttle 16 which includes a throttle valve 18 operated by an accelerator pedal 19. The clutch 14 is actuated by a release fork 20 which is operated by a slave cylinder 22. The gearbox is operated by a gear lever 24. The system further comprises an engine speed signal generator comprising an engine speed sensor 26 which includes a transducer and produces a signal Ve proportional to engine speed; a throttle valve position sensor 30 which produces a throttle signal Vt proportional to the amount which the throttle is open; a pedal position sensor 39 or torque demand sensor for producing a signal variable with the position of the accelerator pedal 19 i.e. the demand for torque from a driver; a gear position sensor 32 which produces a signal Vg corresponding to the gear which is engaged; a gear change sensor or knobswitch 33 on the gear lever 24 which is operated by the driver and which produces a signal Vs indicating an intention to change gear; an actuation sensor 34 which produces a signal Vc varying with the position of the slave cylinder; and a driven plate speed sensor 42 which produces a signal Vdp proportional to the speed of the gearbox input shaft 15, which is equal to that of a driven plate 40 of the clutch 14. Since the speed of the vehicle depends on the driven plate speed and the gear engaged, the driven plate speed sensor 42 acts in effect as a vehicle speed sensor. Signals from the sensors are transmitted to a control unit 36 which controls the actuation of the clutch 14 via a hydraulic control 38. A throttle control 37 is operated by the control unit 36 so that it can open or close the throttle independently of the accelerator pedal 19.

Referring to FIG. 2, time t0 to t1, is prior to clutch disengagement and during acceleration of the vehicle when the engine speed, and therefore Ve, are increasing; the clutch is fully engaged so Vc is at its maximum level cl; and the throttle is held open and so Vt is at a constant level Td.

At time t1 the driver moves the knobswitch 33 as he starts to move the gear lever 24 and this initiates a gear change. This causes signals Vs to be sent to the control unit 36, which causes the hydraulic control 38 to start disengaging the clutch and the throttle control 37 to start to close the throttle.

At t2 an initial disengagement stage of the clutch is completed, the clutch having reached a position where it is partially disengaged but still does not allow slip which could cause the engine to flare. The clutch is then held at the partially disengaged state where Vc=C2, while the throttle continues to close.

At t3 the throttle is closed to a point where the throttle signal Vt=TL. TL is calculated as Tc plus a set increment y where Tc represents a level of throttle opening just sufficient to keep the engine 10 running at the same speed as the clutch driven plate 40, if the clutch were disengaged and the driven plate rotating due to the speed of the vehicle. This means that no torque is being transmitted by the clutch, and is called the "no load throttle" At time t3 a delay timer is triggered which sets a delay t during which time the clutch is still held in its partially disengaged state and the throttle continues to be closed.

At t4, the end of the delay t, a final disengagement stage of the clutch is started and the throttle continues to be closed.

At t5 the throttle reaches a state where Vt=Tc. This is the "no load throttle" as described above. Simultaneously the clutch reaches a point where Vc=Co and the torque transmitting capacity of the clutch reaches zero. Beyond t5 the clutch is brought to full disengagement (at t6) and the throttle is held constant.

The engine speed curve Ve is shown as splitting, curve A representing the engine speed and curve B representing the speed of the clutch driven plate 40 which levels off or decreases slightly with the vehicle speed as the clutch is disengaged, and then falls off rapidly as a higher gear ratio is engaged. Clutch re-engagement is not described here but would be the same as is described in WO 89/10282.

In FIG. 2 from t0 to t6 Ve is shown as gradually increasing. This is because the gear shift is to a higher gear and because of the set rates of clutch disengagement and throttle closing and would clearly alter if those parameters were altered.

The rate of throttle closure, the rate of clutch disengagement during the initial and final disengagement stages, the delay T and the increment y are all set such that the engine never produces more torque than the clutch. The Torque transmitting capacity of the clutch reaches zero at the same time as the throttle reaches the "no load" position. They can all be adjusted to produce the smoothest possible clutch disengagement and the delay T and increment y may be reduced to zero.

Furthermore the increment y can be made to vary with the instantaneous engine and driven plate speeds at the start of the gear shift, so that Vt at t3 is variable in relation to the engine speed at the start of the shift.

In a further embodiment of the invention the throttle is controlled solely by the driver and not by the control unit. In such an embodiment the driver has to use the throttle control intelligently in order to avoid driveline shock, and will achieve a smoother control if he reduces the throttle, if it is at a high level, before disengaging a gear. While the clutch is still engaged excessive force is needed to disengage the gears if they are transmitting torque. The logic already described greatly assists the driver to adapt to the system, since by using only a small force on the gear selection lever he will not disengage the gear until the clutch disengages, which will automatically time itself to the driver's initiative in reducing the throttle.

I claim:

1. A motor vehicle clutch control system for a vehicle friction clutch (14) comprising a clutch position sensor (34), a throttle position sensor (30), gear selection means (24), clutch actuation means (22) and control means (36) (38) arranged such that during clutch disengagement for a gear shift initiated by the gear selection means (24) the clutch actuation means (22) holds the clutch (14) in a partially disengaged position until the sensed throttle signal falls below a predetermined throttle value (TL).

2. A clutch control system according to claim 1 wherein the control means (36) (38) is arranged to cause an initial disengagement stage of the clutch when a gear shift is initiated by the gear selection means.

3. A clutch control system according to claim 2 wherein during the initial disengagement stage the clutch (14) is disengaged to said partially disengaged position.

4. A clutch control system according to claim 1 wherein the control means (36 38) is arranged to hold the clutch (14) in said partially disengaged position for a set delay period after the throttle opening has reached the said predetermined throttle value (TL), 5. A clutch control system according to claim 1 wherein the predetermined throttle value (TL) is related to the engine speed and/or drive plate speed of the vehicle at the movement immediately prior to clutch disengagement.

6. A clutch control system according to claim 5 wherein the predetermined throttle value is calculated from a no-load throttle value (TC) which is the throttle opening required to produce the said engine speed with the clutch fully disengaged.

7. A clutch control system according to claim 6 wherein the predetermined throttle value (TL) is the no-load throttle value (TC) plus an increment (y).

8. A clutch control system according to claim 7 wherein the increment y is variable with the instantaneous engine speed at the start of the gear shift.

9. A clutch control system according to claim 7 further comprising a throttle actuator, wherein the control unit is arranged to cause the throttle to reach the no-load throttle value at the same time as the clutch torque capacity of the clutch is reduced to zero.

* * * * *